United States Patent [19]

Omori et al.

[11] 4,245,602
[45] Jan. 20, 1981

[54] IGNITION TIMING CONTROL METHOD FOR INTERNAL COMBUSTION ENGINE

[75] Inventors: Norio Omori; Hideya Fujisawa, both of Kariya; Yutaka Kawashima, Okazaki; Masakazu Ninomiya, Kariya; Hisasi Kawai, Toyohashi; Takeshi Matsui, Aichi, all of Japan

[73] Assignees: Nippondenso Co., Ltd., Kariya; Nippon Soken, Inc., Nishio, both of Japan

[21] Appl. No.: 973,952

[22] Filed: Dec. 28, 1978

[30] Foreign Application Priority Data

Feb. 15, 1978 [JP] Japan .................................. 53/16311

[51] Int. Cl.³ ............................................. F02P 5/04
[52] U.S. Cl. .................................... 123/425; 123/416; 123/418
[58] Field of Search ........... 123/148 E, 117 R, 117 D, 123/146.5 A, 119 ED; 73/35

[56] References Cited

U.S. PATENT DOCUMENTS

| | | | |
|---|---|---|---|
| 4,002,155 | 1/1977 | Harned et al. | 123/148 E |
| 4,061,116 | 12/1977 | Saida et al. | 123/117 D |
| 4,063,538 | 12/1977 | Powell et al. | 123/148 E X |
| 4,166,440 | 9/1979 | Helava et al. | 123/117 R |

*Primary Examiner*—Tony M. Argenbright
*Attorney, Agent, or Firm*—Cushman, Darby & Cushman

[57] ABSTRACT

A spark-ignition timing of the internal combustion engine is normally set at an MBT (minimum spark advance for best torque). However, when a knocking of the engine is detected by a vibration sensor fixed to the engine, the ignition timing is retarded with respect to the MBT by an angle corresponding to either a non-knocking limit retard angle or a maximum retard angle determined by engine operating conditions whichever is smaller.

6 Claims, 12 Drawing Figures

IGNITION TIMING CONTROL METHOD FOR INTERNAL COMBUSTION ENGINE

BACKGROUND OF THE INVENTION

1. Field of the Invention

The present invention relates to an ignition timing control method and apparatus in a system for sensing knock in an internal combustion engine and retarding the ignition timing, which apparatus prevents the ignition timing from being substantially retarded by abnormality of the retarding system.

2. Description of the Prior Art

In the spark ignition type engine, it is usually desirable to set the ignition timing to an MBT (Minimum spark advance for Best Torque), but as engine load increases, an ignition timing limit for knocking is exceeded when the ignition timing is set to MBT and the knocking occurs.

Furthermore, since the ignition timing limit for knocking changes with engine temperature, fuel octane value and the amount of deposits in the combustion chamber, together with the reasons described above, it is necessary to set the ignition timing to a considerably retarded point. Consequently, engine torque is not maximized.

Heretofore, as an approach to solve the above problem, U.S. Pat. No. 4,002,155 discloses a method in which a vibration of the engine is sensed by a vibration sensor and the ignition timing is set to the MBT by an ignition timing control means in accordance with the conditions of the engine (such as r.p.m. and suction vacuum), and when the knocking of the engine is detected by a knocking detection circuit in response to the output of the vibration sensor, the ignition timing is retarded to effectively utilize the torque of the engine.

However, in the prior method, if the knocking detection circuit erroneously determines the knocking due to a failure occuring between the vibration sensor and the knocking detection circuit, or if the knocking detection circuit erroneously detects the knocking because electric noise is added to the output of the vibration sensor to produce an output different from a true vibration output, the ignition timing is unduly retarded to make the operation of the engine difficult.

SUMMARY OF THE INVENTION

It is an object of the present invention to overcome the above problems and provide an ignition timing control apparatus for an internal combustion engine in which the ignition timing of the internal combustion engine is preset to the MBT in accordance with engine speed (r.p.m.) and load and if a knocking detection circuit detects knocking when the engine is being operated at the present ignition timing, the ignition timing is retarded. In the present invention an ignition timing retard limit is set to prevent the ignition timing from being unduly retarded even if the knocking detection circuit erroneously detects the knocking by some problem occurring between the vibration sensor and the knocking detection circuit or even if the knocking detection circuit erroneously detects knocking because electric noise is added to the output of the vibration sensor to produce an output different from the true vibration output.

In the present invention, if knocking is detected, the ignition timing determined by the ignition timing control means is retarded to the limit of the ignition timing at which the knocking occurs, and by a retardation control circuit, the angle of retardation of the ignition timing is controlled to fall within the limit of angle of retardation determined depending on the engine condition. Accordingly, even if the knocking detection circuit erroneously detects knocking because of failure of the circuit between the vibration sensor and the knocking detection circuit, or even if electric noise is superimposed on the output of the vibration sensor to produce an output different from the true vibration output resulting in erroneous detection of the knocking detection circuit, the angle of retardation is suppressed to a minimum limit which assures proper operation of the engine.

DESCRIPTION OF THE PREFERRED EMBODIMENTS

Figure 1:
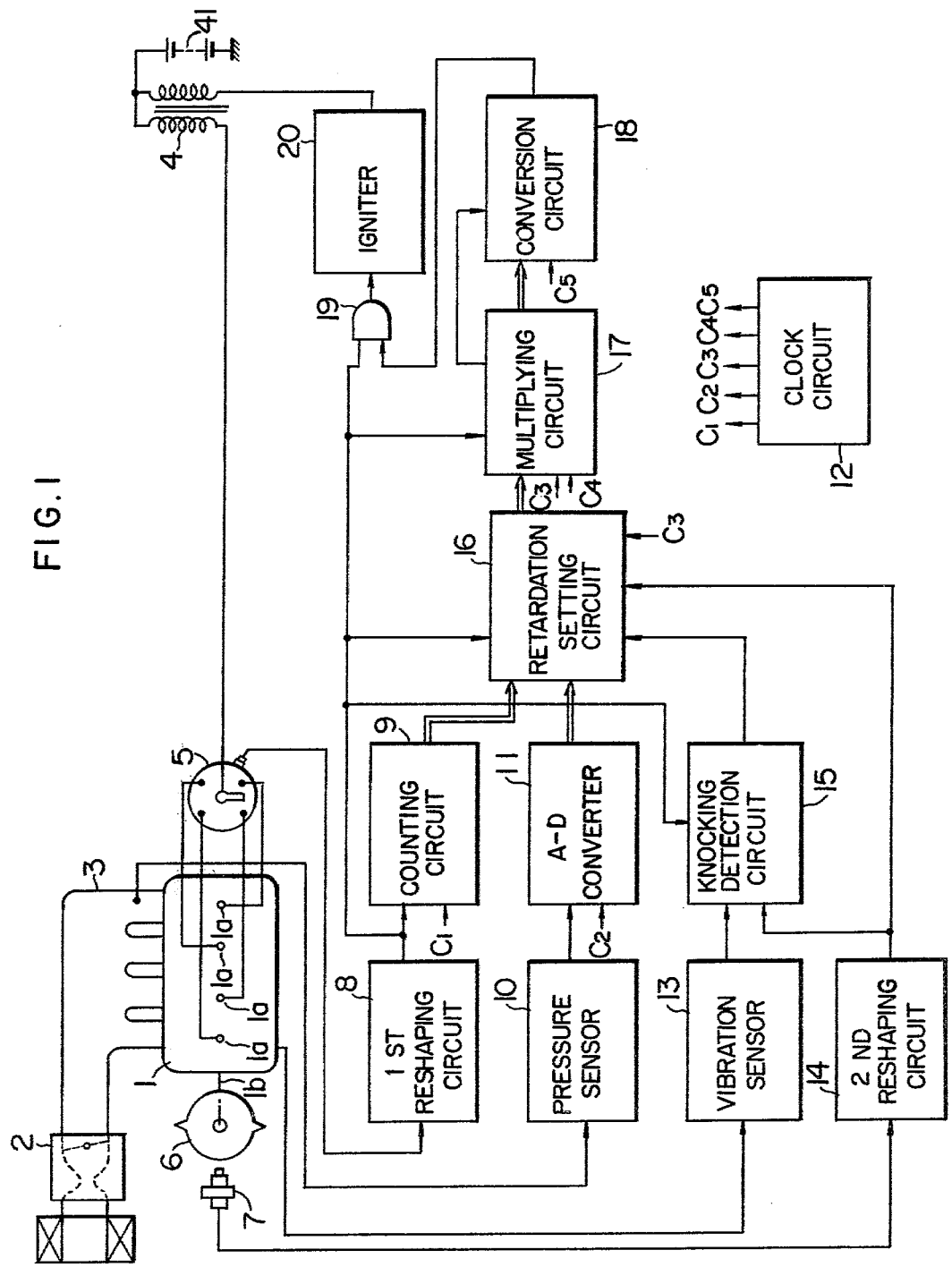
FIG. 1 is a block diagram illustrating one embodiment of the present apparatus.
Figure 6:
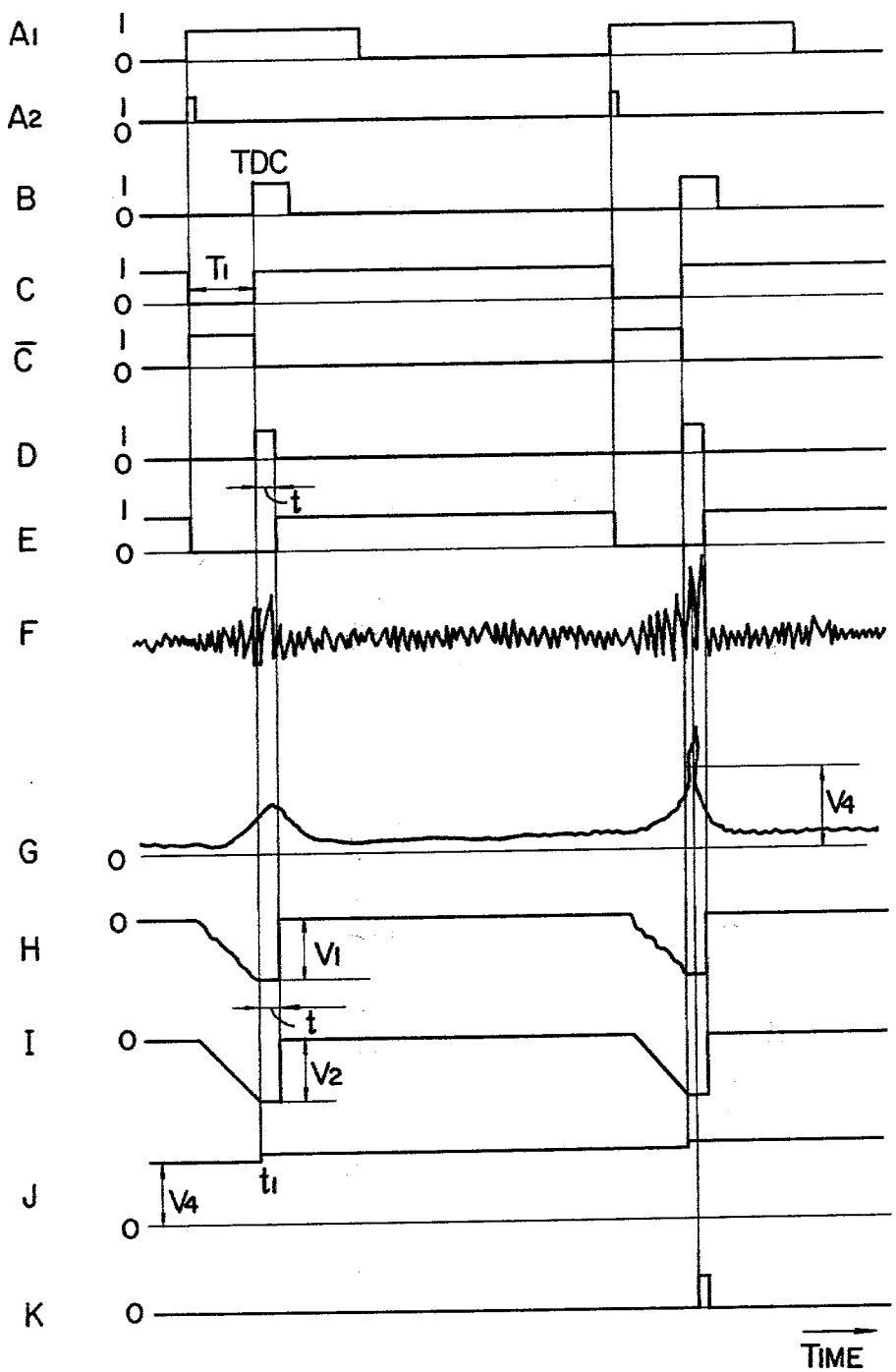
FIG. 6 shows waveforms used to explain the operation of the knocking determination circuit of FIG. 5.

Referring to FIG. 1, an engine 1 is a well-known 4-cylinder 4-cycle spark ignition type engine, which takes in an air-fuel mixture produced in a carburetor 2 through a suction manifold 3. A high voltage is applied to each of spark plugs 1a from an ignition coil 4 through a distributor 5. Numeral 6 denotes a rotary disk mounted on a crank shaft 1b and it is provided with two diametrically opposed projections, each of which corresponds to a top dead center (TDC) of each cylinder piston of the engine 1. Numeral 7 denotes an electromagnetic pickup which produces a signal when each of the projections of the disk 6 faces thereto (at the TDC of each cylinder). Numeral 8 denotes a first reshaping circuit which reshapes a switching signal at a contact, not shown, contained in a distributor 5, and which may be a known circuit including a debouncing circuit. A waveform (A1) in FIG. 6 shows an outpt waveform from the first reshaping circuit 8. The distributor 5 may be a known one which includes a governor advancing unit and a vacuum advancing unit which uses a diaphragm. It is designed such that an opening timing of the contact in the distributor 5 is adjusted to the MBT.

Figure 2:
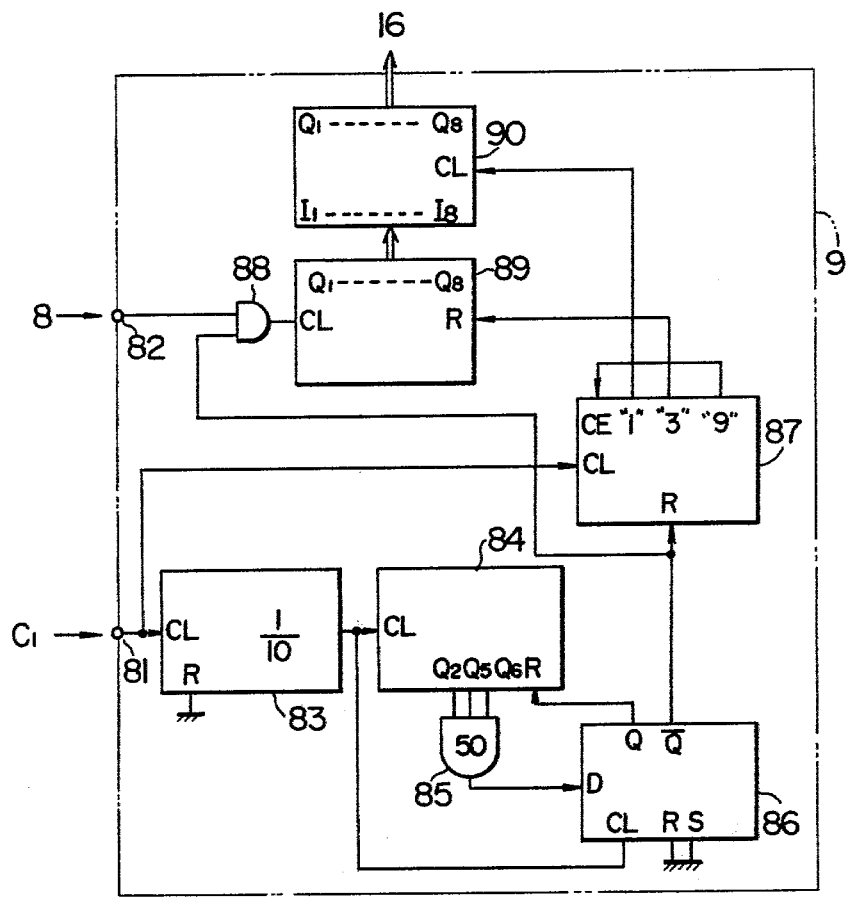
FIG. 2 is a circuit diagram of a counter circuit of the apparatus of FIG. 1.

Numeral 9 denotes a counting circuit which receives the output pulse from the reshaping circuit 8 and a clock pulse $C_1$ from a clock circuit 12 to count an r.p.m. of the engine. It produces a binary coded output. A circuit configuration of the counting circuit 9 is shown in FIG. 2, in which an input terminal 81 is connected to the 1 KHz clock pulse $C_1$ from the clock circuit 12 while an input terminal 82 is connected to the output of the first reshaping circuit 8. Numeral 83 denotes a decimal counter which produces a 100 Hz clock pulse output, which in turn is applied to an input of a binary counter 84. Of the outputs from the binary counter 84, $Q_2$, $Q_5$ and $Q_6$-outputs are connected to a 3-input AND gate 85, an output of which is connected to a data input D of a D-type flip-flop 86. A set input S and a reset input R of the D-type flip-flop 86 are grounded, and a Q-output thereof is connected to a reset terminal R of the binary counter 84 while a $\bar{Q}$ output is connected to a reset terminal R of a counter 87 with a divider (RCA CD4017). A clock input of the counter 87 is connected to the input terminal 81, and a "9"-output is connected to a clock enable terminal CE, a "1"-output is connected to a clock input terminal CL of a memory circuit 90 and a "3"-input is connected to a reset input terminal R of the binary counter 89. One input of a two-input AND gate 88 is connected to the input terminal 82 and the other input is connected to a $\bar{Q}$-output of the D-type flip-flop 86. An output of the AND gate 88 is connected to a clock input terminal of the binary counter 89. The binary coded outputs $Q_1 \ldots Q_8$ of the binary counter 89 are connected to input termnals $I_1 \ldots I_8$ of the memory circuit 90, which may comprise two RCA CD4035's. It produces outputs $Q_1 \ldots Q_8$ which constitute an output of the counting circuit 9.

Figure 3:
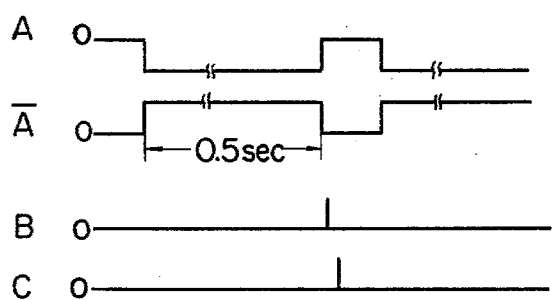
FIG. 3 shows waveforms used to explain the operation of the counter circuit of FIG. 2.

The operation of the arrangement described above is now explained with reference to a timing chart shown in FIG. 3. Since the output of the decimal counter 83 is a 100 Hz clock pulse, the binary counter 84 starts counting when the Q-output of the D-type flip-flop 86 assumes "0" and the output of the AND gate 85 assumes "1" when all of the outputs $Q_2$, $Q_5$ and $Q_6$ assume "1". When the clock input of the D-type flip-flop 86 receives the 100 Hz clock pulse after the output of the AND gate 85 has assumed "1", the Q-output of the D-type flip-flop 86 assumes "1". This waveform is shown in (A) of FIG. 3. Since it is at count 50 of the clock pulse when a logical expression of $Q_2 \times Q_5 \times Q_6 = 1$ is met after the binary counter 84 has been reset, the "0" period of the waveform (A) is 0.5 seconds and the "1" period lasts for 10 milliseconds. The $\bar{Q}$-output of the D-type flip-flop 86 assumes the waveform shown in ($\bar{A}$) of FIG. 3. This waveform is applied to the reset terminal of the counter 87. When the waveform changes from "1" to "0", the counter 87 starts to count the 1 KHz clock pulse $C_1$ after nine clock pulses have been counted, the "9"-output of the counter 87 produces "1" output to stop counting. Consequently, each of the "1"-output and the "3"-output of the counter 87 produces only one pulse since the input signal at the reset terminal has changed from "1" to "0". In FIG. 3, waveforms (B) and (C) show the "1"-output pulse and the "3"-output pulse, respectively, of the counter 87. The AND gate 88 gates the clock pulse from the first reshaping circuit 8 to the binary counter 89 only when the waveform (A) in FIG. 3 assumes "1". Thus, the contact pulses from the distributor 5 are counted by the counter 89 for the period of 0.5 seconds. The counter 89 is reset by the signal (C) shown in FIG. 3, and the count in the counter 89 is stored in the memory circuit 90 by the signal shown in FIG. 3(B). Accordingly, the output of the memory circuit 90 is indicative of the engine r.p.m. in the form of 8-bits binary code.

Turning back to FIG. 1, a pressure sensor 10 is a known semiconductor type sensor which senses a suction vacuum in the suction manifold 3 to produce an analog voltage output. The suction vacuum in the suction manifold 3 corresponds to the load to the engine 1, and for a given r.p.m. of the engine 1, the suction vacuum is low when the load is small and the suction vacuum increases as the load increases. Thus, the pressure sensor 10 senses the load of the engine 1 and it functions as a load sensor.

An A-D converter 11 converts the analog voltage of the pressure sensor 10 to a digital signal in response to the clock pulse $C_2$ from the clock circuit 12. It includes a memory circuit and produces an 8-bits binary coded output.

Figure 4:
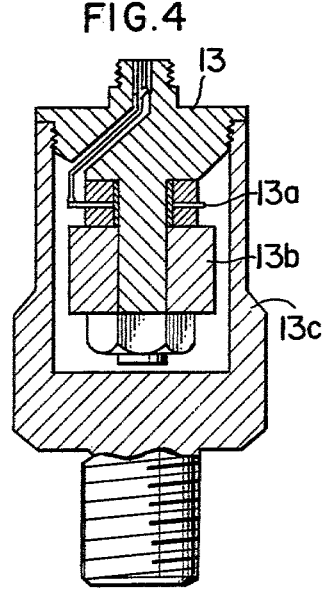
FIG. 4 is a longitudinal sectional view showing, in detail, a vibration sensor in the apparatus of FIG. 1.

A vibration sensor 13 is a piezoelectric type sensor mounted on the cylinder block of the engine 1, and it produces a voltage output indicative of a vibration acceleration utilizing a piezoelectric element. The vibration sensor 13 may have a structure shown in FIG. 4, in which a piezoelectric element 13a together with a weight member 13b which causes the piezoelectric element 13a to deform in response to the vibration are accomodated in a case 13c, which is fixed to the cylinder block of the engine 1 by bolts or the like.

The clock circuit 12 comprises a crystal oscillator and a plurality of counters and logic circuits and it provides the clock pulses $C_1$, $C_2$, $C_3$, $C_4$ and $C_5$ to the respective circuits.

Numeral 14 denotes a second reshaping circuit which reshapes the output signal from the electromagnetic pickup 7. In FIG. 6, (B) shows an output waveform of the second reshaping circuit 14. The output of the second reshaping circuit 14 is connected to a knocking detection circuit 15 and a retardation setting circuit 16.

Figure 5:
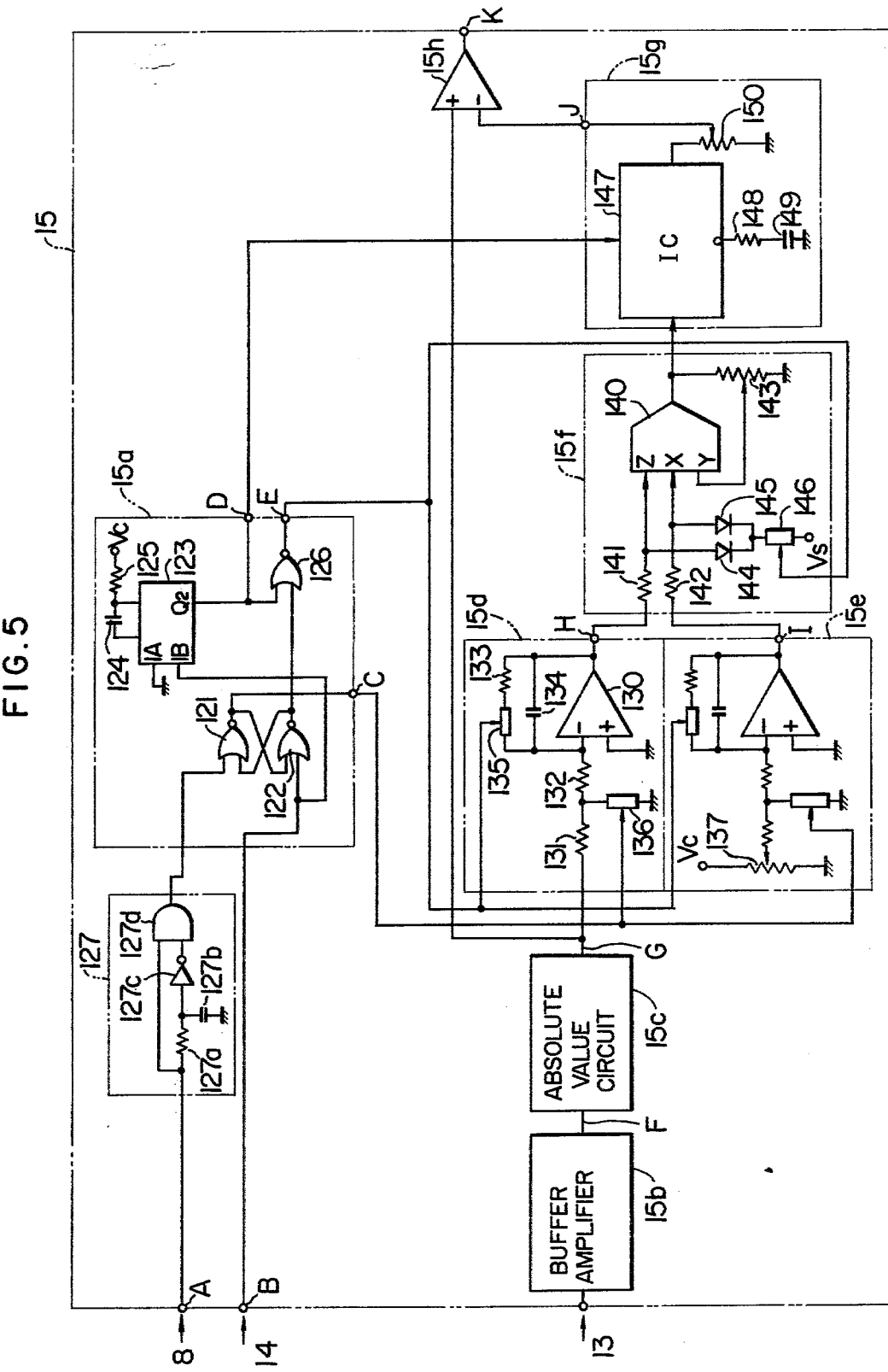
FIG. 5 is a circuit diagram of a knocking determination circuit of the apparatus of FIG. 1.

Referring to FIGS. 5 and 6, the knocking detection circuit 15 will be explained in detail. FIG. 5 shows a circuit diagram of the knocking detection circuit 15 and FIG. 6 shows operational waveforms thereof. In FIG. 5, a control pulse generating circuit 15a comprises an R-S flip-flop and a monostable multivibrator. The R-S flip-flop comprises two NOR gates 121 and 122. The NOR gate 121 receives a signal shown in (A2) of FIG. 6 through a well-known circuit comprising a resistor 127a, a capacitor 127b, an inverter 127c and an AND gate 127d, which circuit receives an MBT signal shown in (A1) of FIG. 6 from the first reshaping circuit 8. On the other hand, the NOR gate 122 receives the output from the second reshaping circuit 14 shown in (B) of FIG. 6, that is, a signal indicative of the top dead center (TDC) of each cylinder.

The NOR gate 121 produces an output waveform shown in (C) of FIG. 6 and the NOR gate 122 produces an output waveform shown in ($\bar{C}$) of FIG. 6.

The monostable multivibrator comprises a monostable multivibrator IC (Texas Instruments Ser. No. 74123) 123 and an off-chip capacitor 124 and an off-chip resistor 125. When the TDC signal from the second reshaping circuit 14 is applied to an input terminal B, the monostable multivibrator produces a pulse signal having a pulse duration of approximately 100 microseconds as shown in (D) of FIG. 6.

The NOR gate 126 performs a NOR function of the output signal from the NOR gate 122 and the output signal from the monostable multivibrator to produce a signal shown in (E) of FIG. 6.

A buffer amplifier 15b is an impedance converter which converts the output signal of the vibration sensor 13 to a low impedance signal and also amplifies the converted signal. An absolute value circuit 15c is a known circuit which produces an absolute value of a positive or negative input signal. It functions to fold over a negative portion of the vibration waveform signal applied from the vibration sensor 13 through the buffer amplifier 15b to a positive side. When the output signal from the buffer amplifier 15b assumes a waveform shown in (F) of FIG. 6, the absolute value circuit 15c produces an output signal shown in (G) of FIG. 6.

A first integrator 15d integrates the waveform shown in (G) of FIG. 6 during the period from the MBT to the TDC and it comprises an operational amplifier 130, resistors 131, 132 and 133, a capacitor 134 and analog switches 135 and 136. The analog switch 135 is turned on and off under the control of a signal shown in (E) of FIg. 6 from the control pulse generating circuit 15a while the analog switch 136 is turned on and off under the control of a signal shown in (C) of FIG. 6.

When the signal C shown in (C) of FIG. 6 is "1", the analog switch 136 is turned on and when the signal E shown in (E) of FIG. 6 is "1", the analog switch 135 is turned on. Thus, when the signals C and E are "1", the output of the first integrator 15d is zero volt, and when the signals C and E are reset to "0", both the analog switches 135 and 136 are turned off and the first integrator 15d starts to integrate in negative direction. The integration continues until the analog switch 135 is again turned on, but since the output signal of the absolute value circuit 15c is applied only during the off-period of the analog switch 136, the integration stops at a time $t_1$ or at the TDC of each cylinder.

A time period t in which a signal D shown in (D) of FIG. 6 assumes "1" is a holding time for the integrator 15d and the output of the integrator 15d does not change during this time period. The output signal waveform of the first integrator 15d thus assumes a waveform shown in (H) of FIG. 6, an output voltage $V_1$ of which is equal to $$-\int_o^{T_1} G\, dt,$$

where $T_1$ is the period in which the signal C is "0", and G is the vibration waveform.

A second integrator 15e is of substantially the same circuit configuration as the first integraor 15d, except that a constant voltage from a voltage divider 137 instead of the vibration waveform is applied as an integration input. The second integrator 15e produces an output signal waveform as shown in (I) of FIG. 6, an output voltage $V_2$ of which is equal to $-\int_o^{T_1} VR\, dt$ which is proportional to time $T_1$, where VR is the output voltage from the voltage divider 137.

A divider 15f divides the output voltage of the first integrator 15d by the output voltage of the second integrator 15e and it comprises a divider/multiplier (Intersil 8013) 140, resistors 141 and 142, divider 143, diodes 144 and 145 and an analog switch 146 which is turned on and off under the control of signal F shown in (E) of FIG. 6 and supplied with a negative supply voltage $-V_s$.

When the signal E is "1", the analog switch 146 is turned on and the negative source voltage $-V_s$ is applied to X and Z-input terminals of the multiplier 140. When the signal E is "0", the output voltage of the first integrator 15d is applied to the Z-input terminal and the output voltage of the second integrator 15e is applied to the X-input terminal. The multiplier 140 performs an arithmetic operation of 10Z/X by the adjustment of the voltage divider 143 and produces an output $V_3$, that is, $$V_3 = 10 \times (-\int_o^{T_1} G\, dt) \div$$

$$(-\int_o^{T_1} VR\, dt) = \frac{K_1 \int_o^{T_1} G\, dt}{T_1}$$

where $K_1$ is the proportional constant ($=10/VR$).

A sample-and-hold circuit 15g comprises a sample-and-hold IC (Intersil 1H5110) 147, a resistor 148, a capacitor 149 and a voltage divider 150, and it samples and holds the output signal of the divider 15f in response to the signal D shown in (D) of FIG. 6 to produce an output signal shown in (J) of FIG. 6. The output voltage of the IC 147 is identical to the output voltage $V_3$ of the divider 140 and this voltage is divided by the voltage divider 150 resulting in an output voltage $V_4$.

Accordingly, the output voltage $V_4$ is expressed by the following equation;

$$V_4 = \frac{K_1 \cdot K_2 \int_o^{T_1} G\, dt}{T_1} = \frac{K \int_o^{T_1} G\, dt}{T_1}$$

where $K_2$ is the division ratio of the voltage divider 150 and $K = K_1 \cdot K_2$. As seen from the above equation, the output voltage $V_4$ represents a mean vibration value from the MBT position to the TDC of each cylinder of the engine 1.

A comparator 15h receives the output signals of the absolute value circuit 15c and the sample-and-hold circuit 15g, and it compares the instantaneous vibration value sensed by the vibration sensor 13 with the mean vibration value between the MBT and the TDC to produce a "1" signal when the instantaneous value is larger than the mean value.

The knock in the engine takes place after the TDC of each cylinder. When it takes place, the instantaneous vibration value is larger than the mean value. Therefore, when knocking occurs, the comparator 15h produces the signal shown in (K) of FIG. 6.

In the manner, the occurrence of knock in the engine 1 is determined by the output signal of the comparator 15h, that is, the output signal of the knocking detection circuit 15.

Figure 7:
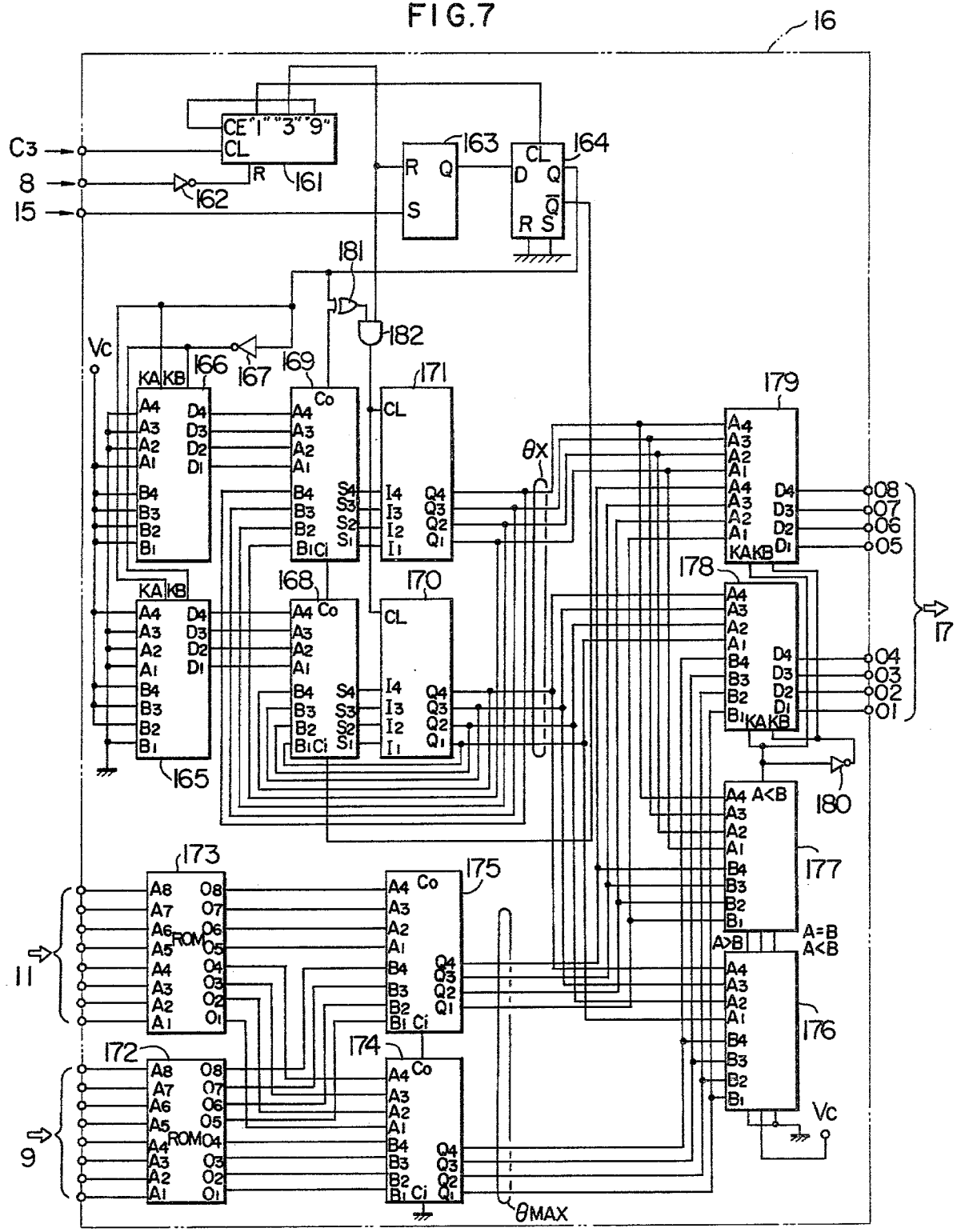
FIG. 7 is a circuit diagram of a retardation setting circuit of the apparatus of FIG. 1.

The retardation setting circuit 16 shown in FIG. 1 is now explained. FIG. 7 shows a specific circuit thereof.

The 200 KHz clock $C_3$ from the clock circuit 12 is applied to a clock input terminal CL of a counter 161 with divider (RCA CD4017) and an output from an inverter 162 is applied to a reset input terminal R. A "9"-output terminal is connected to a clock enable terminal CE and a "1" output terminal is connected to a clock input terminal CL of a D-type flip-flop 164. The output of the first reshaping circuit 8 is applied to an input terminal of the inverter 162. A reset terminal R of the R-S flip-flop 163 is connected to a "3"-output terminal of the counter 161. A set terminal S is connected to the output terminal of the knocking detection circuit 15. An output of the R-S flip-flop 163 is applied to a data input D of a D-type flip-flop 164. Both reset and set terminals R and S of the D-type flip-flop 164 are grounded. A Q-output thereof is applied to terminals $K_A$ of data selectors 165 and 166, an input terminal of an inverter 167 and a "1" input of an exclusive OR gate 181, and a $\bar{Q}$-output is applied to a carry input terminal of an adder 168. An input terminal $K_B$ of the data selector 165 is connected to an output terminal of an inverter 167. An input terminal $A_4$ is connected to a positive voltage supply $V_c$, input terminals $A_1$, $A_2$ and $A_3$ are grounded, input terminal $B_1$ is grounded an input terminals $B_2$, $B_3$ and $B_4$ are connected to the positive voltage source $V_c$. An input terminal $K_B$ of the data selector 166 is connected to the output terminal of the inverter 167, an input terminal $A_1$ is connected to the positive voltage source $V_c$, input terminals $A_2$, $A_3$ and $A_4$ are grounded, and input terminals $B_1$, $B_2$, $B_3$ and $B_4$ are connected to the positive voltage source $V_c$. Output terminals $D_1$, $D_2$, $D_3$ and $D_4$ of the data selector 165 are connected to input terminals $A_1$, $A_2$, $A_3$ and $A_4$, respectively, of the adder 168, and output terminals $D_1$, $D_2$, $D_3$ and $D_4$ of the data selector 166 are connected to input terminals $A_1$, $A_2$, $A_3$ and $A_4$, respectively, of the adder 169. Both the data selectors 165 and 166 may be RCA CD4019. Input terminals $B_1$, $B_2$, $B_3$ and $B_4$ of the adder 168 are connected to output terminals $Q_1$, $Q_2$, $Q_3$ and $Q_4$, respectively, of a shift register 170. A carry output terminal is connected to a carry input terminal of the adder 169. Output terminals $S_1$, $S_2$, $S_3$ and $S_4$ are connected to input terminals $I_1$, $I_2$, $I_3$ and $I_4$, respectively, of the shift register 170. Input terminals $B_1$, $B_2$, $B_3$ and $B_4$ of the adder 169 are connected to output terminals $Q_1$, $Q_2$, $Q_3$ and $Q_4$, respectively, of a shift register 171. Output terminals $S_1$, $S_2$, $S_3$ and $S_4$ are connected to input terminals $I_1$, $I_2$, $I_3$ and $I_4$, respectively of the shift register 171. A carry output terminal is connected to the other input of the exclusive OR gate 181. Both the adders 168 and 169 may be RCA CD4008.

Clock input terminals CL of the shift registers 170 and 171 are connected to an output terminal of an AND gate 182 which receives the "3"-output of the counter 161 and the output of the exclusive OR gate 181. Both the shift register 170 and 171 may be RCA CD4035. In the shift registers 170 and 171, reset terminals, not shown, are grounded, and input terminals P/S, J, $\bar{K}$, T/C, also not shown, are connected to the positive voltage source $V_c$. Input terminals $A_1$, $A_2$, $A_3$, $A_4$, $A_5$, $A_6$, $A_7$ and $A_8$ of a P-ROM 172 are connected to the output terminals of the counting circuit 9 in an ascending order. Output terminals $O_1$, $O_2$, ... $O_8$ are connected to the input terminals $B_1$–$B_4$ of the adder 174 and the input terminals $B_1$–$B_4$ of the adder 175, respectively. Input terminals $A_1$, $A_2$, $A_3$, $A_4$, $A_5$, $A_6$, $A_7$ and $A_8$ of a P-ROM 173 are connected to the output terminals of the A-D converter 11 in ascending order. Output terminals $O_1$, $O_2$, ... $O_8$ are connected to the input terminals $A_1$–$A_4$ of the adder 174 and the input terminals $A_1$–$A_4$ of the adder 175, respectively. Both the adders 174 and 175 may be RCA CD4008. A carry input terminal of the adder 174 is grounded and a carry output terminal is connected to a carry input terminal of the adder 175. The adders 174 and 175 produces an 8-bit sum output of a programmed value of the P-ROM 172 and a programmed value of the P-ROM 173. Numerals 178 and 179 denote 8-bits data selectors which may be RCA CD4019. Input termnals $B_4$–$B_1$ of each of the data selectors 178 and 179 are connected to the output terminals $Q_4$–$Q_1$ of the adders 174 and 175, respectively, in a descending order. The output terminals $Q_1$, $Q_2$, $Q_3$ and $Q_4$ of the memory circuit 170 are connected to input terminals $A_1$, $A_2$, $A_3$ and $A_4$, respectively, of a comparator 176 and input terminals $A_1$, $A_2$, $A_3$ and $A_4$, respectively, of a data selector 178. Output terminals $Q_1$, $Q_2$, $Q_3$ and $Q_4$ of the memory circuit 170 are connected to input terminals $A_1$, $A_2$, $A_3$ and $A_4$, respectively, of a comparator 177 and input terminals $A_1$, $A_2$, $A_3$ and $A_4$, respectively, of a data selector 179.

Input terminals A<B and A>B of the comparator 176 are both grounded and an input terminal A=B is connected to the positive voltage supply $V_c$. Output terminals A>B, A=B and A<B are connected to input terminals A>B, A=B and A<B, respectively, of the comparator 177. An output terminal A<B of the comparator 177 is connected to both input terminals KA of the data selectors 178 and 179 and an input terminal of an inverter 180. An output terminal of the inventor 180 is connected to input terminals $K_B$ of the data selectors 178 and 179. Output terminals $D_1$, $D_2$, $D_3$ and $D_4$ of the data selector 178 are connected to output terminals $O_1$, $O_2$, $O_3$ and $O_4$, respectively, of the retardation settting circuit 16, and output terminals $D_1$, $D_2$, $D_3$ and $D_4$ of the data selector 179 are connected to output terminals $O_5$, $O_6$, $O_7$ and $O_8$, respectively, of the retardation setting circuit 16. The comparators 176 and 177 may be RCA CD4063, and the data selectors 178 and 179 may be RCA CD4019.

Figure 8:
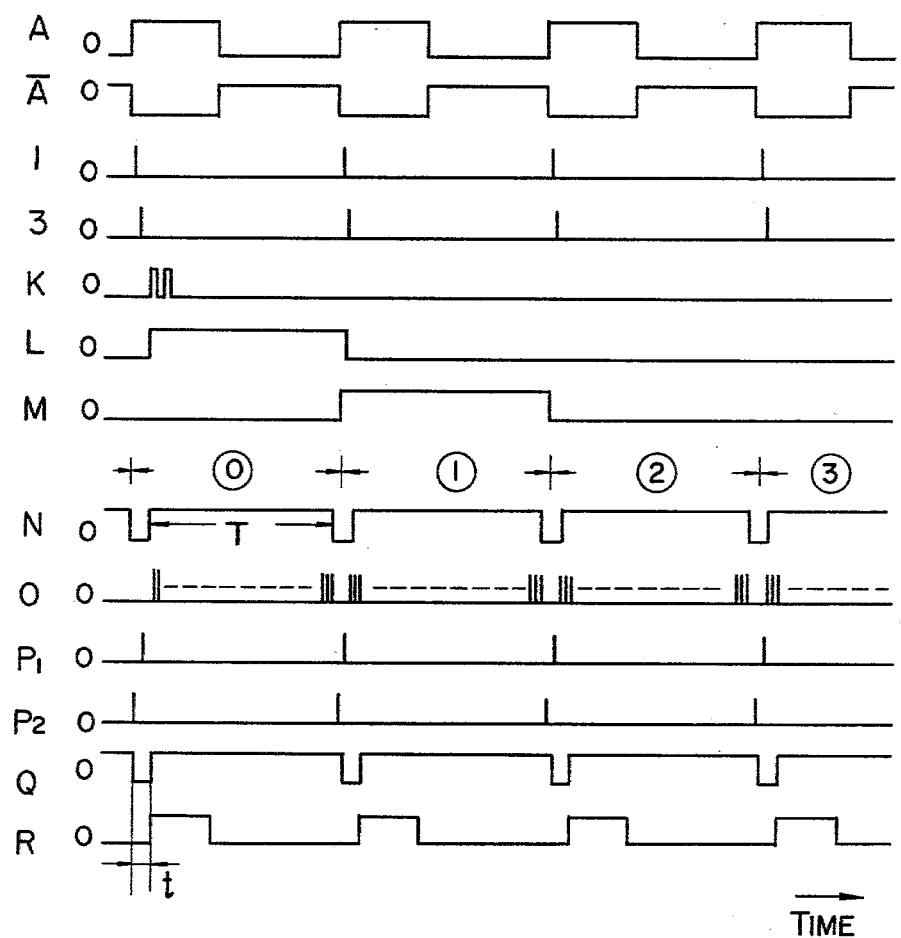
FIG. 8 shows waveforms used to explain the operation of the retardation setting circuit of FIG. 7.

The operation of the arrangement described above is explained with reference to waveforms shown in FIG. 8. An MBT waveform shown in (A) of FIG. 8 is applied to the input terminal of the inverter 162. Thus, an output from the inverter 162, as shown in ($\bar{A}$) of FIG. 8 is applied to the reset terminal of the counter 161. When the counter 161 is reset, since the 200 KHz clock pulse $C_3$ is being applied to the clock terminal, it operates in the same manner as the counter 87 shown in FIG. 2 so that the "1" output terminal of the counter 161 produces a waveform shown in (1) of FIG. 8 and the "3"-output terminal produces a waveform shown in (3) of FIG. 8. Thus, the waveform shown in (3) of FIG. 8 is applied to the reset terminal of the R-S flip-flop 163 and the signal shown in (K) of FIG. 8 from the knocking detection circuit 15 is applied to the set terminal. Thus, the Q-output of the R-S flip-flop 163 assumes a waveform shown in (L) of FIG. 8. Accordingly, the Q-output of the D-type flip-flop 164 assumes a waveform shown in (M) of FIG. 8. The "0" level in the waveform M indicates the absence of knocking of the engine and the "1" level indicates the presence of knocking. In this manner, the knocking can be detected in synchronism with the crank shaft rotation.

When the Q-output of the D-type flip-flop 164 is "1", the $K_A$ inputs of the data selectors 165 and 166 are "1" and the data selectors 165 and 166 produce the data received at the input terminals A. When the Q-output is "0", the $K_B$-input is "1" and the data selectors 165 and 166 produce the data received at the input terminals B. The A-input corresponds to 6° in an crank angle. On the other hand, when the B-input is applied, the carry input of the adder 168 is "1". The B-input is preset with a complement corresponding to 0.25° in the crank angle. If the outputs of the memory circuits 170 and 171 are "0" and the Q-output of the D-type flip-flop 164 is "1", the outputs of the adders 168 and 169 are "00011000" (corresponding to 6° in the crank angle). Since the "3"-output of the counter 161 is subsequently applied to the clock input terminals of the memories 170 and 171, the outputs of the memories 170 and 171 assume "000110000" (corresponding to 6° in the crank angle). (State ① in (M) of FIG. 8). In state ② in (M) of FIG. 8, the O-output of the D-type flip-flop 164 is "0" and the Q̄-output is "1" and the data selectors 165 and 166 produce the data received at the input terminals B. Accordingly, the adders 168 and 169 function as a subtractor to carry out an arithmetic operaton of 000110000−00000001=00010111 (corresponding to 5.75° in the crank angle). This value is produced from the output terminals of the memories 170 and 171.

In state ③ in (M) of FIG. 8, if it is at "0", the adders 168 and 169 again function as the subtractor to carry out an arithmetic operation of 00010111−00000001=00010110 (corresponding to 5.50° in the crank angle).

In this manner, if the knocking is present, an angle of 6° is added, and if the knocking is absent, an angle of 0.25° is subtracted so that the value approaches the outputs of the memories 170 and 171. When the waveform in (A) of FIG. 8 rises at the MBT, the content of the memories 170 and 171 represents the angle of retardation from the MBT. If the knocking is absent, the waveform (M) of FIG. 8 is "0" and the angle of retardation is reduced by 0.25° for each pulse shown in (3) of FIG. 8. When the content of the memories 170 and 171 tends to become negative, the carry output of the adder 169 assumes "0" so that both inputs to the exclusive OR gate 181 are "0" and it produce "0" output to prevent further clock input from being applied to the memories 170 and 171. Therefore, the point of MBT is finally reached.

Figure 9A:
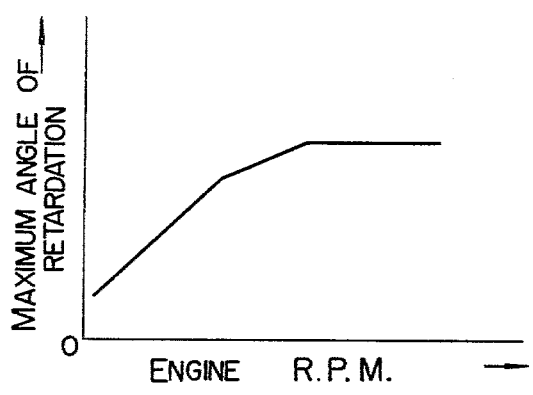
FIGS. 9a and 9b show characteristic curves of P-ROMs 172 and 173 respectively.

The P-ROM 172 is programmed such that a maximum angle of retardation at the knocking from the MBT, represented by an angle of advancement of the engine r.p.m. is addressed by an engine r.p.m. FIG. 9a shows a characteristic thereof.

Figure 9B:
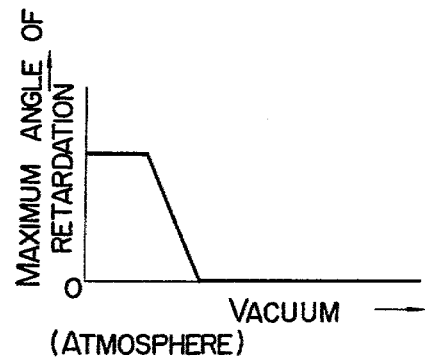

The P-ROM 173 is programmed such that a maximum angle of retardation at the knocking from the MBT, represented by an angle of advancement of the vacuum, is addressed by an engine vacuum. FIG. 9b shows a characteristic thereof. The output of the P-ROM 172 representative of the angle of advancement of engine r.p.m. and the output of the P-ROM 173 representative of the angle of advancement of the vacuum are parallel added in the address adders 174 and 175 to produce a total maximum angle of retardation $\theta_{MAX}$ from the MBT at the knocking. The least significant bit position of the subtractors 174 and 175 corresponds the crank angle of 0.25°.

The angle of retardation $\theta_X$ of the memories 170 and 171 are compared with the angle $\theta_{MAX}$ in the comparators 176 and 177, and if $\theta_X \geq \theta_{MAX}$, the A<B - output of the comparator 177 assumes "0" and the data selectors 178 and 179 produce the data received at the input terminals B. Consequently, the data selectors 178 and 179 produce the output $\theta_{MAX}$. If $\theta_X < \theta_{MAX}$, the A<B - output of the comparator 177 is "1" and the data selectors 178 and 179 produce the data received at the input terminals A. As a result, the data selectors 178 and 179 produce the output $\theta_X$. In this manner, the angle of retardation of the retardation setting circuit 16 is prevented from exceeding $\theta_{MAX}$.

Figure 10:
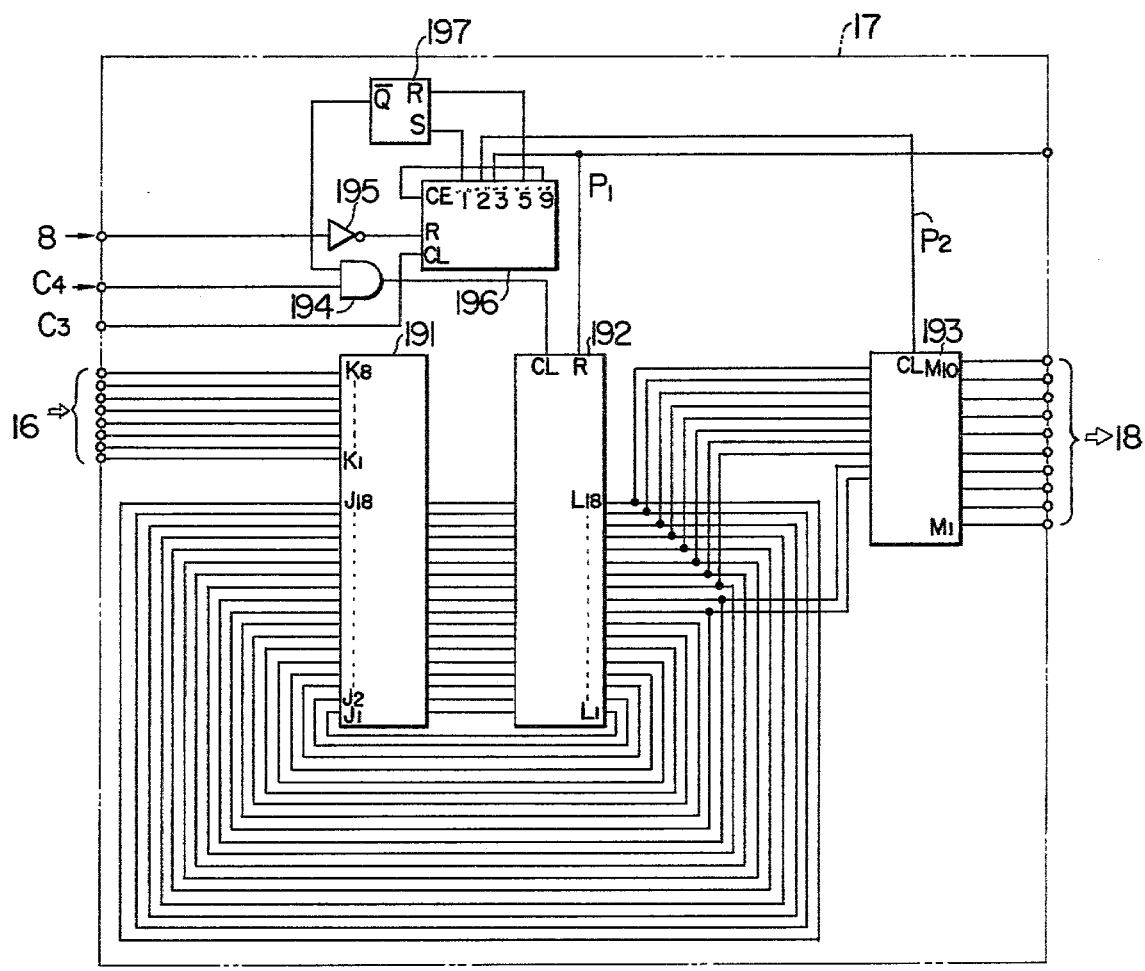
FIG. 10 is a circuit diagram of a multiplying circuit of the apparatus of FIG. 1.

A multiplication circuit 17 shown in FIG. 1 is now explained. FIG. 10 shows a specific circuit diagram thereof. The multiplication circuit 17 comprises a parallel adder (RCA CD4008) 191, a memory (RCA CD4035) 192, a memory (RCA CD4035) 193, an AND gate 194, an inverter 195, a counter 196 with divider, and an R-S flip-flop 197. Output terminals $L_{18} \ldots L_1$ of the memory 192 are connected to input terminals $J_{18} \ldots J_1$, respectively, of the parallel adder 191, and input terminals $K_8 \ldots K_1$ of the parallel adder 191 are applied with the binary coded outputs $O_8 \ldots O_1$ of the retardation setting circuit 16. Output terminals of the adder 191 are connected to input terminals of the memory 192. The counter 196 is designed such that when it receives nine clock signals it is prevented from counting further.

An input terminal of the inverter 195 is connected to the MBT-output terminal of the first reshaping circuit 3 and an output terminal is connected to a reset terminal of the counter 196. Set terminal and reset terminal of the R-S flip-flop 197 are connected to "1"-output terminal and "5"-output terminal, respectively, of the counter 196. One input terminal of the AND gate 194 receives the 25.6 KHz clock pulse $C_4$ from the clock circuit 12, and a clock input terminal of the counter 196 receives the clock pulse $C_3$. The other input terminal of the AND gate 194 is connected to the Q̄-output of the R-S flip-flop 197. Input terminals of the memory 193 are connected to higher order 10-bit positions of the memory 192 and output terminals $M_{10} \ldots M_1$ of the memory 193 provide an output of the multiplication circuit 17.

The operation of the arrangement described above is now explained with reference to FIG. 8. The operation of the counter 196 is identical to the operation of the divider 161 in the retardation setting circuit 16. The Q̄-output of the R-S flip-flop 197 produces a waveform (N) shown in FIG. 8. Thus, the AND gate 194 produces n pulses proportional to time T as shown in (O) of FIG. 8. After the output of the first reshaping circuit 8 has changed to "1", the clock pulse $C_3$ is counted in the counter 196, which produces pulses shown in ($P_1$) and ($P_2$) of FIG. 8 at the second and fourth pulses, respectively. The memory 192 is reset by the pulse $P_1$ so that the output $L_{18} \ldots L_1$ assumes "0 ... 0". Thereafter, each time the clock signal shown in (O) of FIG. 8 is received from the AND gate 194, the output $L_{18} \ldots L_1$ of the memory 192 changes to $K_8 \ldots K_1, 2 \times K_8 \ldots K_1, \ldots, n \times K_8 \ldots K_1$. The memory 173 stores higher order 10-bits of the output $n \times K_8 \ldots K_1 M_{10} \ldots M_1$ in response to the pulse shown in ($P_2$) of FIG. 8. Since the number n of the clock signals is proportional to the time T as described above and the signal $K_8 \ldots K_1$ is binary coded signal, the multiplication circuit 17 produces the angle of retardation $\theta \times T = T_\theta$ in binary code. The time T is approximately equal to a cycle period in (A) of FIG. 8. Accordingly, the time T corresponds to a crank angle of 180° at a certain r.p.m. of the engine. Thus, the delay time $T_\theta$ corresponding to the angle of retardation $\theta$ is given by $$T_\theta = (1/180) \cdot \theta \times T$$

since $\theta/180 = T_\theta/T$. Since the time T is proportional to a reciprocal of the engine r.p.m. i.e., N, $T_\theta$ is proportional to $\theta \times (1/N)$. Thus, $T_\theta$ has a value which is the conversion of the angle of retardation $\theta$ in accordance with the engine r.p.m. N to the delay time. The clock frequency of the clock signal $C_4$ is equal to 25.6 KHz. Thus, when the engine r.p.m. is 3000, the cycle period of the contact signal from the distributor 5 corresponds to 10 milliseconds. Therefore, the number n of the clock pulses shown in (C) of FIG. 8 received during this period is approximately equal to 256 and hence the output value of the multiplication circuit 14 is equal to the input value. If the input value is "00011000" (=6°), the output value is also "0000011000" at 3000 r.p.m. At 6000 r.p.m. the output value is "0000001100" since the number of clocks is one half of that at 3000 r.p.m.

Figure 11:
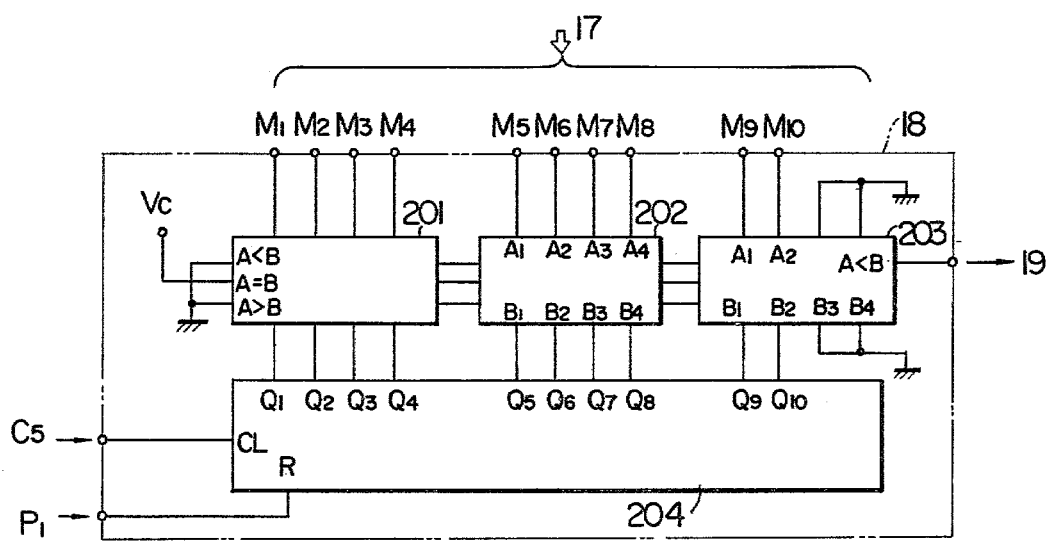
FIG. 11 is a circuit diagram of a conversion circuit of the apparatus of FIG. 1.

A circuit configuration of a conversion circuit 18 shown in FIG. 1 is illustrated in FIG. 11. Comparators 201, 202 and 203 may be three RCA CD4063's connected in parallel. Input terminals $A_1$, $A_2$, $A_3$ and $A_4$ of the comparator 201 are connected to output terminals $M_1$, $M_2$, $M_3$ and $M_4$, respectively, of the multiplication circuit 17, input terminals $A<B$ and $A>B$ are both grounded and an input terminal $A=B$ is applied with the voltage $V_c$. Input terminals $B_1$, $B_2$, $B_3$ and $B_4$ are connected to output terminals $Q_1$, $Q_2$, $Q_3$, and $Q_4$, respectively of the counter 204. Output terminals $A<B$, $A=B$ and $A>B$ are connected to input terminals $A<B$, $A=B$, $A>B$, respectively, of the comparator 202, and input terminals $A_1$, $A_2$, $A_3$ and $A_4$ of the comparator 202 are connected to output terminals $M_5$, $M_6$, $M_7$ and $M_8$, respectively, of the multiplication circuit 17. Input terminals $B_1$, $B_2$, $B_3$ and $B_4$ are connected to output terminals $Q_5$, $Q_6$, $Q_7$ and $Q_8$, respectively, of the counter 204. Output terminals $A<B$, $A=B$ and $A>B$ are connected to input terminals $A<B$, $A=B$ and $A>B$, respectively, of the succeeding comparator 203. Input terminals $A_1$ and $A_2$ of the comparator 203 are connected to output terminals $M_9$ and $M_{10}$, respectively, of the multiplication circuit 17. Input terminals $A_3$ and $A_4$ are both grounded. Input terminals $B_1$ and $B_2$ are connected to output terminals $Q_9$ and $Q_{10}$, respectively, of the counter 204. Input terminals $B_3$ and $B_4$ are both grounded. An output terminal $A<B$ provides an output of the conversion circuit 18. A clock terminal of the counter 204 receives the clock pulse $C_5$ from the clock circuit 12. A reset terminal is connected to the "4"-output terminal of the counter in the multiplication circuit 17.

The operation of the arrangement described above is explained. As the counter 204 is reset by the pulse shown in $P_1$) of FIG. 8, the outputs $Q_{10} \ldots Q_1$ all assume "0". Then, the counter 204 counts up the clock pulses $C_5$ and when the binary coded content $Q_{10} \ldots Q_1$ of the counter 204 reaches the binary number $M_{10} \ldots M_1$, the $A<B$ - output of the comparator 203 changes from "0" to "1" as shown in (Q) of FIG. 8. Thus, the conversion circuit 18 funcions to convert the binary coded number to a pulse width. The clock pulse $C_5$ applied to the conversion circuit 18 has a frequency of 72 KHz. Thus, when the value of $M_{10}$, $M_9$, ... $M_1$ of the multiplication circuit 17 corresponds to the engine r.p.m. of 3000, it is "0000011000" ($=24$) and the delay time t in the output of the conversion circuit 18, that is, in (Q) of FIG. 8 is equal to $24 \times 1 \div 72000 = 0.333$ milliseconds. Accordingly, at 3000 r.p.m., since one cycle period of the contact signal corresponds to 180°, the delay time of 0.333 milliseconds corresponds to the crank angle of 6° (from equation of 180°/10 milliseconds=x/0.333 milliseconds).

One input terminal of an AND gate 19 shown in FIG. 1 is connected to the MBT-output terminal of the first reshaping circuit 8 and the other input terminal is connected to the output terminal of the conversion circuit 18. Thus, the AND gate 19 produces an output waveform as shown in (R) of FIG. 8.

Numeral 20 denotes an igniter which power-amplifies the output signal from the AND gate 19 to drive an ignition coil 4 by a power supply battery 41. It is commercially available and known per se, and hence the explanation thereof is omitted. When the signal in (R) of FIG. 8 rises from "0" to "1", the ignition coil 4 is excited to ignite. The time t from the rise in (A) of FIG. 8 corresponds to the delay time from the MBT and hence corresponds to the angle of retardation from the MBT. When the angle of retardation is 0°, the delay time t is equal to 0 and the ignition occurs at the rise in (A) of FIG. 8, that is, at the MBT. This delay time t is restricted by the P-ROM's, 172 and 173 of the retardation setting circuit 16 in FIG. 7. Therefore, if some trouble occurs, for example, if the vibration sensor 13 does not work or noise is introduced to increase the angle of retardation $\theta_X$ more and more, the engine torque reduces until it misfires and stops. By setting the maximum angle of retardation $\theta_{MAX}$ depending on the engine r.p.m. from the MBT and the suction vacuum by the P-ROM's 172 and 173 so that the angle of retardation does not become smaller than the maximum angle of retardation $\theta_{MAX}$ or a minimum angle of advancement even if the ignition timing is retarded more and more by the failure of the vibration sensor 13, the decrease of torque below a predetermined torque is prevented when the minimum angle of advancement for that predetermined torque is set.

In the embodiment described above, a mechanical ignition timing control means including the governor advancement unit and the vacuum advancement unit having the diaphragm has been shown. However, an ignition timing control means which electronically controls the ignition timing to the MBT depending on the engine condition such as engine r.p.m. or suction vacuum may be used instead.

Furthermore, in the above embodiment, while the angle of retardation $\theta_X$ at the occurrence of knocking is compared with the maximum angle of retardation $\theta_{MAX}$ defined depending on the engine condition to prevent the angle of retardation $\theta_X$ from exceeding the maximum angle of retardation $\theta_{MAX}$, it should be understood that the angle of retardation of the ignition timing from the MBT may be controlled within the limit of the angle of retardation determined depending on the engine condition by comparing the ignition timing retarded by the angle $\theta_X$ from the MBT with the minimum advancement angle characteristic determined depending on the engine condition to prevent the ignition timing from being retarded beyond the minimum advancement angle characteristic.

We claim:
1. A method for controlling ignition spark timing for an internal combustion engine having an output shaft rotated by a piston, the method comprising the steps of:
  detecting operating conditions of said internal combustion engine;
  determining a desired timing of spark ignition supplied to said internal combustion engine in response to said operating conditions detected by said detecting step;
  monitoring a magnitude of vibration of said internal combustion engine by vibration responsive means coupled to said internal combustion engine;
  averaging said magnitude of vibration monitored before an arrival of the piston of said internal combustion engine at the top dead center position by said monitoring step;
  comparing said magnitude of vibration monitored after the arrival of said piston at the top dead center position by said monitoring step with an average output of said averaging step;

determining a retard value of spark ignition in response to a comparison output of said comparing step;

determining a maximum retard value of spark ignition in response to said operating conditions detected by said detecting step;

comparing said retard value of spark ignition determined by said second-named determining step with said maximum retard value of spark ignition determined by said third-named determining step;

correcting said desired timing of spark ignition determined by said first-named determining step by an amount equal to said retard value and maximum retard value determined by said second-named and third-named determining steps in response to a comparison output of said second-named comparing step indicative of said retard value being smaller and larger than said maximum retard value, respectively; and supplying a spark ignition voltage at a timing of spark ignition corrected by said correcting step.

2. A method according to claim 1, wherein said averaging step comprises the steps of:

detecting a first rotational position of an output shaft of said internal combustion engine prior to the arrival of said piston at the top dead center position;

detecting a second rotational position of said output shaft indicative of the arrival of said piston at the top dead center position;

integrating said magnitude of vibration monitored by said monitoring step during the rotation of said output shaft from said first to second rotational positions detected by said first and second position detecting steps, respectively;

integrating a predetermined magnitude during the rotation of said output shaft from said first to second rotational positions detected by said first and second position detecting steps, respectively; and dividing an integration output of said former integrating step by an integration output of said latter integrating step so that a division output is utilized as said average output by said first-named comparing step.

3. A method for controlling ignition spark timing for an internal combustion engine having an output shaft rotated by a piston, the method comprising the steps of:

detecting operating conditions of said internal combustion engine including at least engine rotational speed;

determining a desired spark ignition timing supplied to said internal combustion engine in response to said operating conditions detected by said detecting step;

monitoring a magnitude of vibration of said internal combustion engine by vibration responsive means coupled to said internal combustion engine;

averaging said magnitude of vibration monitored by said monitoring step before an arrival of the piston of said internal combustion engine at the top dead center position;

comparing said magnitude of vibration monitored after the arrival of said piston at the top dead center position by said monitoring step with an average output of said averaging step;

determining a retard value of spark ignition in response to a comparison output of said comparing step;

determining a maximum retard value of spark ignition in response to said operating conditions detected by said detecting step, said maximum retard value being increased with increased engine rotational speed;

comparing said retard value of spark ignition determined by said second-named determining step with said maximum retard value of spark ignition determined by said third-named determining step;

correcting said desired timing of spark ignition determined by said first-named determining step by an amount equal to said retard value and maximum retard value determined by said second-named and third-named determining steps in response to a comparison output of said second-named comparing step indicative of said retard value being smaller and larger than said maximum retard value, respectively; and supplying a spark ignition voltage at a timing of spark ignition corrected by said correcting step.

4. A method for controlling ignition spark timing for an internal combustion engine having an output shaft rotated by a piston, the method comprising the steps of:

detecting operating conditions of said engine including at least engine rotational speed;

determining a desired timing of spark ignition supplied to said internal combustion engine in response to said operating conditions detected by said detecting step;

monitoring the magnitude of vibration of said internal combustion engine with vibration responsive means coupled to said internal combustion engine;

comparing said magnitude of vibration monitored by said monitoring step after the arrival of said piston at the top dead center position with a reference value;

determining a retard value of spark ignition in response to a comparison output of said comparing step;

determining a maximum retard value of spark ignition in response to said operating conditions detected by said detecting step, said maximum retard value being increased with increased engine rotational speed;

comparing said retard value with said maximum retard value;

correcting said desired timing by an amount equal to said retard value and maximum retard value in response to a comparison output of said second-named comparing step indicative of said retard value being smaller and larger than said maximum retard value, respectively; and supplying a spark ignition voltage at a timing of spark ignition corrected by said correcting step.

5. Apparatus for controlling ignition spark timing for an internal combustion engine, comprising:

means for generating condition signals related to operating conditions of said engine;

means for determining a desired ignition spark timing in response to said condition signals;

means for generating a vibration signal related to the magnitude of vibration of said engine;

means for comparing said vibration signal after the arrival of a piston of said engine at the top dead center position with a reference signal;

means for determining a spark ignition retard value in response to the output of said comparing means;

means, responsive to said condition signals, for determining a maximum ignition timing retard value;

means for comparing said retard value and said maximum retard value and correcting said desired timing by said retard value when said retard value is less than said maximum retard value and by said maximum retard value when said retard value is greater than said maximum retard value; and means for supplying a spark voltage at said corrected spark timing.

6. Apparatus for controlling ignition spark timing for an internal combustion engine, comprising:

means for generating condition signals related to operating conditions of said engine including at least engine rotational speed;

means for determining a desired ignition spark timing in response to said condition signals;

means for generating a vibration signal related to the magnitude of vibration of said engine;

means for comparing said vibration signal after the arrival of a piston of said engine at the top dead center position with a reference signal;

means for determining a spark ignition retard value in response to the output of said comparing means;

means, responsive to said condition signals, for determining a maximum ignition timing retard value, said maximum retard value being increased with increased engine rotational speed;

means for comparing said retard value and said maximum retard value and correcting said desired timing by said retard value when said retard value is less than said maximum retard value and by said maximum retard value when said retard value is greater than said maximum retard value; and means for supplying a spark voltage at said corrected spark timing.

* * * * *